May 19, 1959     I. B. KUBILIUNAS     2,886,850
HEATING ELEMENT FOR PLASTIC

Filed Jan. 24, 1957     3 Sheets-Sheet 1

INVENTOR.
IGNAS B. KUBILIUNAS
BY
ATTORNEYS

May 19, 1959     I. B. KUBILIUNAS     2,886,850
HEATING ELEMENT FOR PLASTIC
Filed Jan. 24, 1957     3 Sheets-Sheet 2
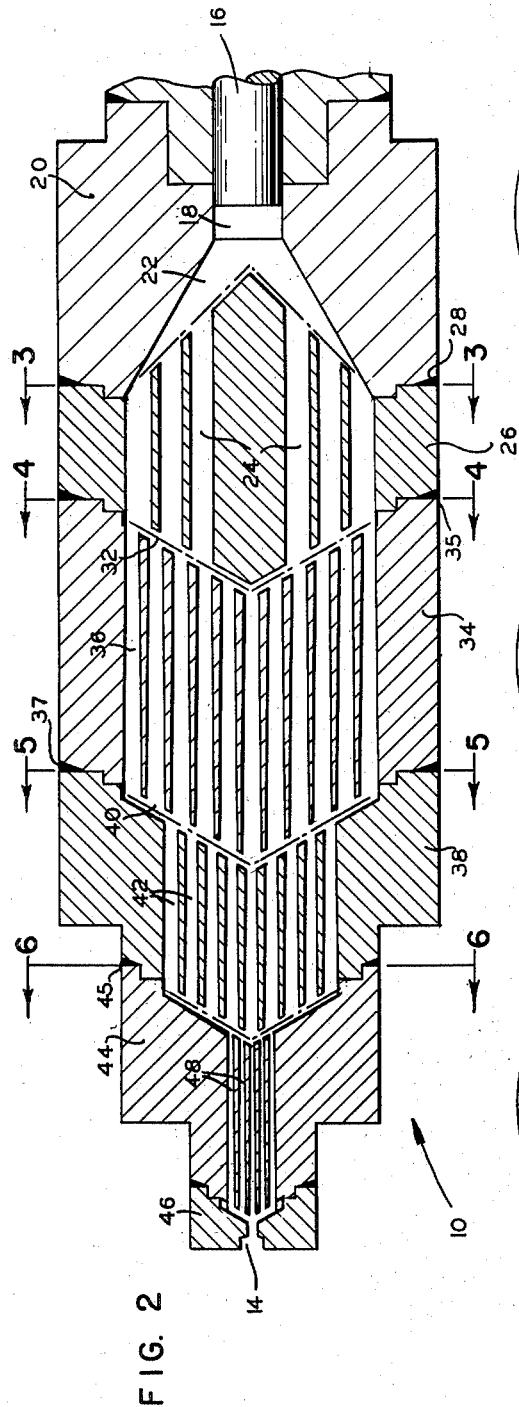
FIG. 2
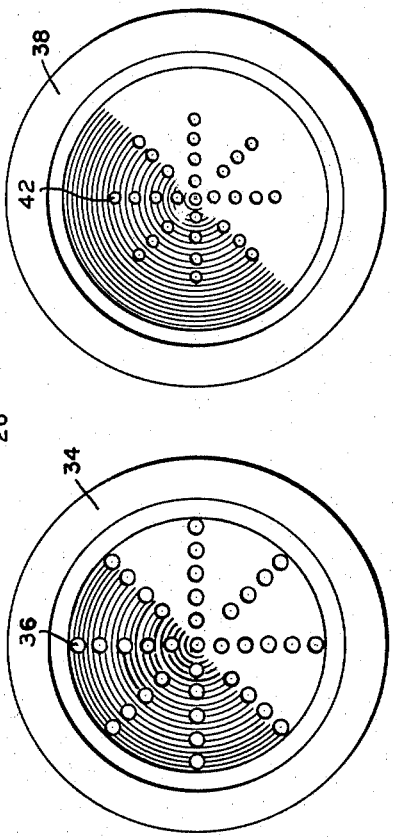
FIG. 5
FIG. 4
FIG. 3
INVENTOR.
IGNAS B. KUBILIUNAS
BY
Porter, Chittick & Russell
ATTORNEYS May 19, 1959     I. B. KUBILIUNAS     2,886,850
HEATING ELEMENT FOR PLASTIC
Filed Jan. 24, 1957     3 Sheets-Sheet 3
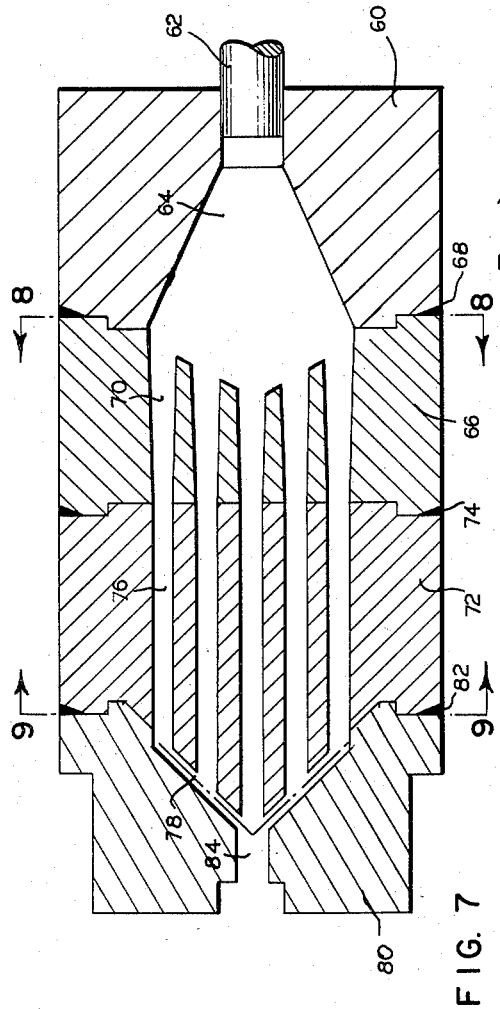
FIG. 7
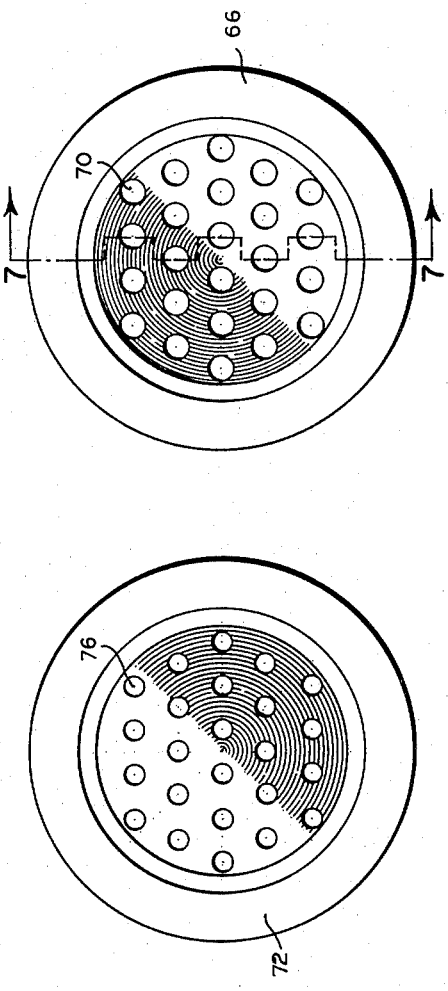
FIG. 9
FIG. 8
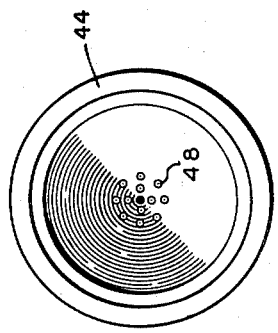
FIG. 6
*INVENTOR.*
IGNAS B. KUBILIUNAS
BY
*Porter Chittick & Russell*
*ATTORNEYS*

2,886,850
HEATING ELEMENT FOR PLASTIC

Ignas B. Kubiliunas, South Boston, Mass.

Application January 24, 1957, Serial No. 636,001

7 Claims. (Cl. 18—30)

This invention relates to heating elements for plastic injection molding machines, and more particularly to the construction of the element through which the plastic is passed for heating purposes in the process of injection molding.

Heating plastic for injection molding presents a number of problems. In the first place, most thermoplastic materials are relatively non-conductive to heat, and it is, therefore, difficult to heat any substantial quantity of the material rapidly and in a single mass. In addition, rapid heating cannot be accomplished by raising the temperature because if this is done the plastic decomposes or scorches. Scorching is also a problem even without the application of extra heat because if the plastic clogs locally in the heating element and is permitted to rest for any substantial length of time, it will also scorch even at normal heating temperatures. Another problem involved in the construction of heating mechanisms for this purpose relates to metal fatigue. It will be understood that the cold plastic is forced into the heating mechanisms under extremely high pressures, and this results in setting up conditions of mechanical and thermal stress which lead to metal fatigue over periods of constant use.

It is, therefore, an object of my invention to provide a heating element for plastic injection molding machines in which the plastic to be heated is distributed in contact with a wide area of rapidly conductive metal surface under conditions in which the plastic will not tend to clog within the machine or remain motionless adjacent to any given portion of said heating surface for any substantial length of time. Another object of my invention is to provide a heating element for plastic which will, at one and the same time, rapidly heat the plastic, avoid scorching the same, and be fully reinforced against both mechanical and thermal stresses and strains which otherwise tend to set up metal fatigue. Still another object of my invention is to provide a heating element in which the configuration and spacing of the plastic conduits or passages within the heating element is arranged particularly to provide distribution of surface area while at the same time maintaining strength against metal fatigue.

In the accomplishment of these and other objects of my invention in a preferred embodiment thereof, I employ a solid metal heating block with conventional heating elements surrounding it and with passages through the core of the block to convey plastic from an injection ram at one end of the block to the molding elements at the other end of the block.

It is a feature of my invention that these passages are arranged within the block roughly in an outer group nearest the surface and an inner group nearest the central core of the block. It is a further feature of my invention that each of the passages is spaced from adjacent passages sufficiently to ensure adequate conduction of heat through the metal to the entire surface of each said passage. Still another feature of my invention relates to the longitudinal form of these passages. They are constructed to taper inwardly in one embodiment from the point where they receive the cold plastic to a mid-point within the heating element and thereafter to taper outwardly in the areas where the plastic will be more fluid. Still another feature of my invention relates to forming the heating element in segments, each segment of which progressively accommodates the plastic more readily in its more fluid state as the heating progresses. Still another feature relates to providing enlarged paths between the passages nearest the surface of the block to ensure adequate conduction of heat through the block to the passages in the inner group.

Further objects and features of my invention will best be understood and appreciated from a detailed description of a preferred embodiment thereof, selected for purposes of illustration, and shown in the accompanying drawing, in which:

Fig. 2 is a sectional plan view taken along the lines 2—2 of Fig. 1;

Fig. 3 is a view in end elevation of one of the segments of the heating block of my invention taken along the lines 3—3 of Fig. 2;

Fig. 4 is a view in end elevation of another segment of the heating block taken along the lines 4—4 of Fig. 2;

Fig. 5 is a view in end elevation of still another segment of the heating block taken along the lines 5—5 of Fig. 2;

Fig. 6 is a view in end elevation of the final segment taken along the lines 6—6 of Fig. 2;

Fig. 7 is a plan section showing another embodiment of the heating block of my invention taken along the lines 7—7 of Fig. 9;

Fig. 8 is a view in end elevation of one segment of the block shown in Fig. 7 and taken along the lines 9—9 of Fig. 7; and Fig. 9 is a view in end elevation of another segment of the block shown in Fig. 7 taken along the lines 8—8 of Fig. 7.

Figure 1:
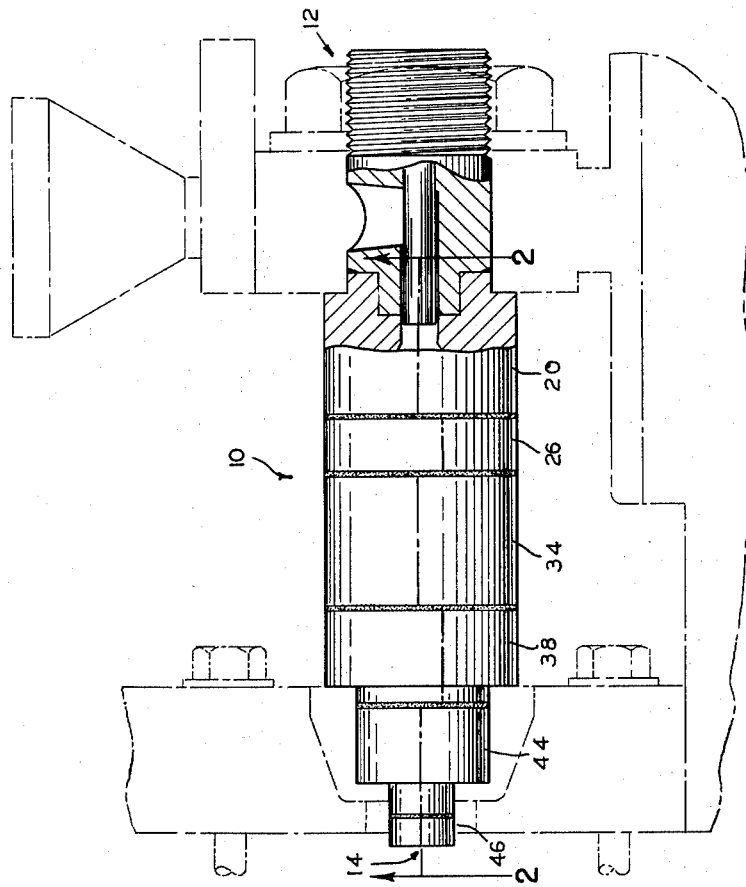
Fig. 1 is a view in side elevation of the heating block of my invention showing the surrounding elements of an injection molding machine in broken lines.

The preferred embodiment of my invention herein shown in Fig. 1 includes a cylindrical heating block designated generally at 10 in an injection molding machine located between an injection ram and hopper feed mechanism indicated at 12, and an outlet 14 leading to the mold. It will be understood that the block 10 is surrounded by conventional heating elements which are not shown herein because they form no part of the invention claimed.

The details of the construction of the heating block 10 are shown more specifically in Figs. 2–6 wherein it will be seen that a ram 16 operates within a cylindrical passage 18 in a base block 20. The ram 16 forces plastic through the passage 18 and into a widened area constituting an inlet chamber 22 likewise formed within the base block 20. From here the plastic proceeds into the radially arranged spaced passages 24 located in a first intermediate segment 26 which is welded at 28 to the base block 20. The passages 24 may be seen in end elevation in Fig. 3 wherein it will be noted that they are tapered inwardly at their point of entrance as indicated at 30. This taper provides a smooth and easy access for the plastic into the passages 24. Further in connection with Fig. 3, it will be seen that the passages 24 radiate in rows spaced 45 degrees apart and are symmetrically spaced throughout the block 26 with one group being located near the core of the block 26 and another group being located near the outer surface of the block. Also the outer passages 24 are spaced considerably further apart than those towards the center core of the block. This spacing insures a rapid transfer of heat to all the passages 24 and prevents the passages 24 which are nearest to the heating elements from obstructing the flow of heat through the block to the passages 24 nearest the center core thereof.

It should also be noted in regard to the configuration of the passages 24 that they are round in cross section and are flanked by a substantial thickness of metal on all sides. This means that heat is rapidly conducted to their entire surface and the full strength of the circular form of passage may be attained. In this way heat is applied to the plastic uniformly wherever it contacts metal, and in addition, the fluid pressure of the plastic within the passages is resisted by a substantial thickness of surrounding metal.

After passing through the segment 26, the plastic then enters a conical chamber 32 from which it passes into a second intermediate segment 34 which is provided with radially arranged passages 36 of a smaller diameter than the passages 24. Segment 34 is welded to segment 26 at 35. In the chamber 32 the plastic is forced to change its direction and follow a somewhat tortuous path between the outlet end of the passages 24 and the inlet of the passages 36. This change of direction may be increased by offsetting the position of the passages 34 from that of passages 24. For maximum dispersion, the radial rows of holes 24 in segment 26 will be set at an angle of 22½ degrees with respect to the radial rows of holes 36 in segment 34.

With reference to Fig. 2, it will be seen that the passages 36 are tapered with their inlet end being the narrowest point. The purpose of this taper is two-fold. First, it makes it easier to locate and remove blockages in the passages; and second, it serves to equalize pressure within the plastic which naturally becomes more fluid as it moves through the heating area. A third segment 38 is welded at 37 to the segment 34 and the plastic passing from the segment 34 to the segment 38 must pass through a conical chamber 40 which is similar to the chamber 32. Also in the segment 38 the plastic enters passages 42 which are smaller in diameter than the passages 34 and offset therefrom circumferentially with the maximum offset being at an angle of 22½ degrees. In addition, passages 42 are provided with an expanding taper similar to that of passages 34. A final segment 44 is welded at 45 to the segment 38 and connects in turn to an orifice block 46. The segment 44 is provided with passages 48 also preferably offset with respect to passages 42 through which the hot plastic passes on its way to the opening 14 and thence to the mold.

With reference to Figs. 4, 5 and 6, it will be seen that the passages 36, 42 and 48 respectively are disposed in substantially the same manner as the passages 24 are disposed within segment 26. Thus heat is rapidly conducted to all surfaces of these passages, and this, in turn, promotes free motion of the plastic through all passages by ensuring a more uniform application of heat to the plastic in all areas where it contacts the metal. In addition, the circular form, together with substantial surrounding metal thickness, ensures strength against metal fatigue and minimizes thermal stress.

Turning now to the embodiment of my invention shown in Figs. 7-9, I have here shown a smaller unit which is suitable for use where volume requirements are not so great. In this embodiment a base block 60 receives a ram 62 which forces plastic into an inlet chamber 64. An intermediate segment 66 is welded at 68 to block 60 in a manner similar to the connection between the segments in the embodiment shown in Fig. 2. Likewise segment 66 is provided with passages 70 through which the plastic is forced from the chamber 64. In this connection I have provided the passages 70 with a slightly narrowing taper, and I do this in order to promote easy access of the plastic into the said passages 70. A second intermediate segment 72 is welded at 74 to the segment 66, and is provided with passages 76 which are in exact registration with the narrow ends of the passages 70 of the segment 66. In this instance, it will be noted that the passages 76 are simply cylindrical passages without taper. When the plastic passes through the passages 76, it then enters a flat conical chamber 78 defined by the end of the segment 72 and an inner surface of an end block 80 which is welded at 82 to the segment 72. From here the plastic enters a vortex outlet 84 through which it passes to the mold.

In this embodiment of my invention with reference to Figs. 8 and 9, it will be seen that the passages 70 and 76 are symmetrically spaced throughout the central area of the block and that the passages occupy roughly two groups, one comprising a group of passages more nearly located in the core of the segments 66 and 72 and the other group occupying the peripheral area thereof. It will be further seen that the passages 70 and 76 are spaced from one another by a substantial distance which serves to permit a ready access of heat to be conducted through the metal to the entire surface of the passages 70 and 76. Also it will be seen that each one of the passages 70 and 76 is surrounded by a sufficient body of metal to provide each passage with substantial support against both thermal and mechanical stress.

The operation of the heating element of my invention will now be readily understandable to those skilled in the art. Plastic is forced into the device by means of a conventional injection molding ram and proceeds through the various passageways provided through the segments of the heating block. A wide surface area contact with the plastic is provided by increasing the number of passages through which the plastic may pass, but the entire surfaces of these passages are maintained at approximately proper temperature by insuring a free access of heat through conduction through the entire mass of the segment to the surface area of each passage. In addition, the passages are reinforced by a substantial thickness of metal surrounding them in all cases.

In operation the heating block of my invention is extremely satisfactory having greatly outlasted conventional blocks used for this same purpose. It is extremely easy to repair in that no special fittings are required. The welds between the segments may be cut out and repaired areas may be reached without any great difficulty.

It will now be apparent to those skilled in the art that certain minor variations of the preferred embodiments herein shown are feasible. For instance, it is not absolutely necessary for me to employ the cylindrical form of block shown, but other cross sectional shapes may be employed as long as the passages are of sufficient diameter and the thickness of metal between the passages is adequate for transfer of heat, as well as support against thermal and mechanical stresses. Further variations will be apparent to those skilled in the art, and therefore, it is not my intention to confine the invention to the precise form herein shown, but rather to limit it in terms of the appended claims.

Having thus described and disclosed a preferred embodiment of my invention, what I claim as new and desire to secure by Letters Patent of the United States is:

1. Apparatus for conducting heat to plastic in injection molding machines comprising a metal block formed from a plurality of separate segments joined together, a first segment, an inlet chamber within said first segment for receiving relatively cold plastic, a first intermediate segment, passages in said first intermediate segment for conveying said cold plastic from said inlet chamber longitudinally of said block, a second intermediate segment, a shallow conical chamber between said first and second intermediate segments, passages in said second intermediate segment for conveying said plastic from said shallow chamber longitudinally of said block, said passages in said second intermediate segment being out of alignment with the passages of said first intermediate segment, a plurality of substantially thick paths of solid metal leading uninterruptedly from the core of said each intermediate segment to the side surfaces thereof and completely surrounding each said passage with a substantial thickness of metal, a final segment, and an outlet chamber in said final segment for receiving relatively hot plastic from said passages in said second intermediate segment and for conveying said plastic to a mold.

2. The apparatus for conducting heat to plastic in injection molding machines as defined by claim 1 further characterized by the passages of each segment being arranged in radial rows, the rows of passages in adjacent segments being angularly disposed with respect to each other.

3. Apparatus for conducting heat to plastic in injection molding machines comprising a metal block formed from a plurality of segments joined together, a first segment, an inlet chamber within said first segment for receiving relatively cold plastic, a plurality of successive intermediate segments each having a plurality of radially arranged longitudinal holes extending therethrough with the holes of each following segment being smaller than the holes of the preceding segment, said segments being integrally secured to each other about their peripheries, the longitudinal axes of a majority at least of the holes of a following segment being offset with respect to the longitudinal axes of the holes of the preceding segment, the adjacent ends of the holes of adjacent segments terminating in the opposed surfaces of a conical shaped shallow chamber in which the apex of said chamber is in the direction of flow of said plastic, the said holes of each segment being so located in each segment so as to provide a continuous metallic path from all surfaces of said holes to the exterior of each said segment whereby heat from the exterior of each said segment may be readily transmitted to said surfaces and a final segment secured peripherally to the last intermediate segment and interiorly spaced from the ends of the holes of the said last intermediate segment by a similar shallow conical chamber, and an outlet at the center of said last conical chamber for conveying fluid plastic to a mold.

4. Apparatus for conducting heat to plastic injection molding machines as set forth in claim 3 in which the holes in at least some of said intermediate sections taper outwardly in the direction of the flow of said plastic.

5. Apparatus for conducting heat to plastic in injection holding machines comprising a metal block formed from a plurality of segments joined together, a first segment, an inlet chamber within said first segment for receiving relatively cold plastic, a plurality of successive intermediate segments each having a plurality of longitudinal holes extending therethrough and generally distributed over the cross-section of the segment, the holes of each following segment being smaller than the holes of the preceding segment, said segments being integrally secured to each other about their peripheries, the longitudinal axes of a majority at least of the holes of a following segment being offset with respect to the longitudinal axes of the holes of the preceding segment, the adjacent ends of the holes of adjacent segments terminating in the opposed surfaces of a conical shaped shallow chamber in which the apex of said chamber is in the direction of flow of said plastic, the said holes of each segment being so located in each segment so as to provide a continuous metallic path from all surfaces of said holes to the exterior of each said segment whereby heat from the exterior of each said segment may be readily transmitted to said surfaces and a final segment secured peripherally to the last intermediate segment and interiorly spaced from the ends of the holes of the said last intermediate segment by a similar shallow conical chamber, and an outlet at the center of said last conical chamber for conveying fluid plastic to a mold.

6. Apparatus for conducting heat to plastic in injection molding machines comprising a metal block formed from a plurality of separate segments joined together, a first said segment, an inlet chamber within said first segment for receiving relatively cold plastic, a plurality of intermediate segments arranged within said block in series with each other and each terminating in a convex conical face which forms the inner side of a shallow conical chamber, a plurality of independent passages in said intermediate segments for conveying said plastic from said inlet chamber longitudinally of said block to said successive conical chambers, said passages within each of said intermediate segments being progressively smaller in over-all diameter and angularly offset with respect to each other so that plastic flowing from the passages of one segment to the passages of the next segment must travel laterally through the conical chamber therebetween, said passages being distributed over the entire cross-sectional area of said intermediate segments and terminating at said respective conical chambers, a final segment and an outlet chamber in said final segment for receiving relatively hot plastic from the last said conical chamber and for conveying the same to a mold, and means for conducting heat to the entire surface of each said passage and for providing each said passage with support to resist high pressure fluid within each said passage comprising a substantial thickness of metal surrounding each said passage and a plurality of substantially thick paths of solid metal leading uninterruptedly from the core of said segment to the side surfaces thereof.

7. Apparatus for conducting heat to plastic in injection molding machines comprising a metal block formed from a plurality of separate segments joined together, a first said segment, an inlet chamber within said first segment for receiving relatively cold plastic, a plurality of intermediate segments arranged within said block in series with each other and each terminating in a convex conical face which forms the inner side of a shallow conical chamber, a plurality of independent passages in said intermediate segments for conveying said plastic from said inlet chamber longitudinally of said block to said successive conical chambers, said passages within each of said intermediate segments being angularly offset with respect to each other so that plastic flowing from the passages of one segment to the passages of the next segment must travel laterally through the conical chamber therebetween, and a final segment and an outlet chamber in said final segment for receiving relatively hot plastic from the last said conical chamber and for conveying the same to a mold.

References Cited in the file of this patent

UNITED STATES PATENTS

| | | |
|---|---|---|
| 2,179,968 | Thompson | Nov. 14, 1939 |
| 2,358,354 | Stacy et al. | Sept. 19, 1944 |
| 2,766,483 | Stokes | Oct. 16, 1956 |
| 2,779,972 | Kins | Feb. 5, 1957 |